United States Patent
Higuchi et al.

[11] 3,878,399
[45] Apr. 15, 1975

[54] OPTICAL CHARACTER DISPLAY DEVICE

[75] Inventors: Hiroshi Higuchi, Akashi; Hiroshi Fujita, Kakogawa; Yasutoshi Masuda, Ashiya, all of Japan

[73] Assignee: Yamato Scale Company, Limited, Akashi-shi, Hyogo-ken, Japan

[22] Filed: Sept. 19, 1973

[21] Appl. No.: 398,700

[30] Foreign Application Priority Data
Oct. 3, 1972   Japan.................................. 47-9945
Feb. 20, 1973  Japan.................................. 48-20491
Dec. 28, 1972  Japan.................................. 48-2466

[52] U.S. Cl................ 250/570; 250/227; 350/96 R; 340/380
[51] Int. Cl................................................... G08c 9/06
[58] Field of Search ........... 250/227, 568, 569, 570, 250/237 R; 350/96 R, 96 B; 340/380, 336

[56] References Cited
UNITED STATES PATENTS
3,329,475  7/1967  Hasala........................... 350/96 R X
3,566,602  3/1971  Bergey et al. ................. 350/96 B X
3,744,048  7/1973  Treichel.......................... 340/380 X

*Primary Examiner*—Walter Stolwein

[57] ABSTRACT

An optical display device having a code plate with transparent and opaque portions, a light source on one side of said code plate and a plurality of light transmitting segments each having one end adjoining the code plate and the other end forming part of a character to be displayed. By displacement of the code plate relative to said one end of said segments, selected segments can be illuminated to display selected characters.

6 Claims, 10 Drawing Figures

OPTICAL CHARACTER DISPLAY DEVICE

This invention relates to a novel and improved optical character display device preferably applicable to the digital display of a quantity which can be converted into a mechanical displacement, and more specifically to the digital display of a measured value in a weighing balance.

In a prior digital display systems in digital balances, a digital code pattern carried on a code plate which moves with a vertical swing of the weighing cradle is photoelectrically read out and the resulting electric signal is processed in a processing circuit such as a matrix decoder. The output of the processing circuit is selectively applied to specific luminescent electrodes of a digital display tube to indicate a numeral corresponding to the read-out code. However, such prior digital display systems have not been satisfactory since the electric signal processing circuit is generally complicated and expensive and, moreover, the digital display tube has relatively short life.

Therefore, an object of this invention is to provide a novel and improved optical character display device which does not use electric signals and electrical circuits, and which is simple in structure, can be manufactured at low cost and affords a long semipermanent lifetime.

According to this invention, the display device comprises a code plate carrying a coded pattern of a predetermined character, said pattern being composed of a predetermined number of transparent and opaque sections, a light source for illuminating the code plate from one side thereof, and a plurality of display segments corresponding to the number of said transparent and opaque sections, said display segments having light inlet ends facing said transparent and opaque sections, light outlet ends arranged to form a part of the predetermined character and elongated light guides communicating with said ends.

Other objects and features of this invention will be described in detail hereinunder with reference to the accompanying drawings.

In the drawings:

FIG. 1 is a schematic perspective view illustrating the main structural components of an embodiment of the optical character display device according to this invention;

FIG. 2 (1), (2), and (3) are perspective views of three embodiments of the display segment used in the device of this invention;

Figure 1:
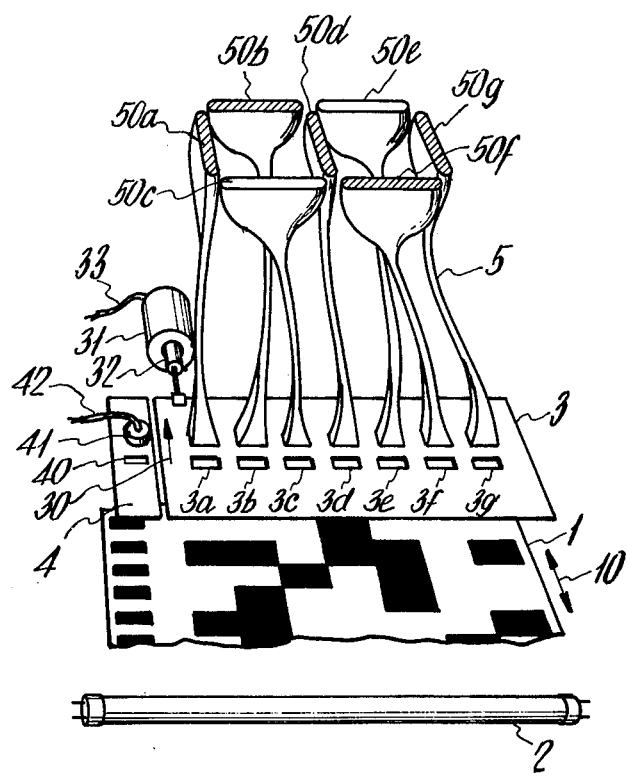
Figure 5:
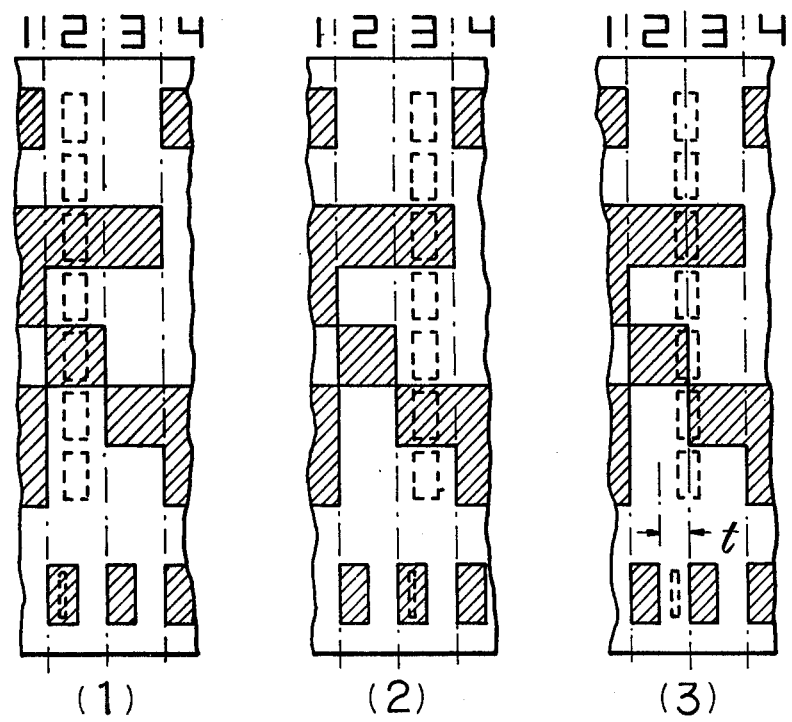
Figure 6:
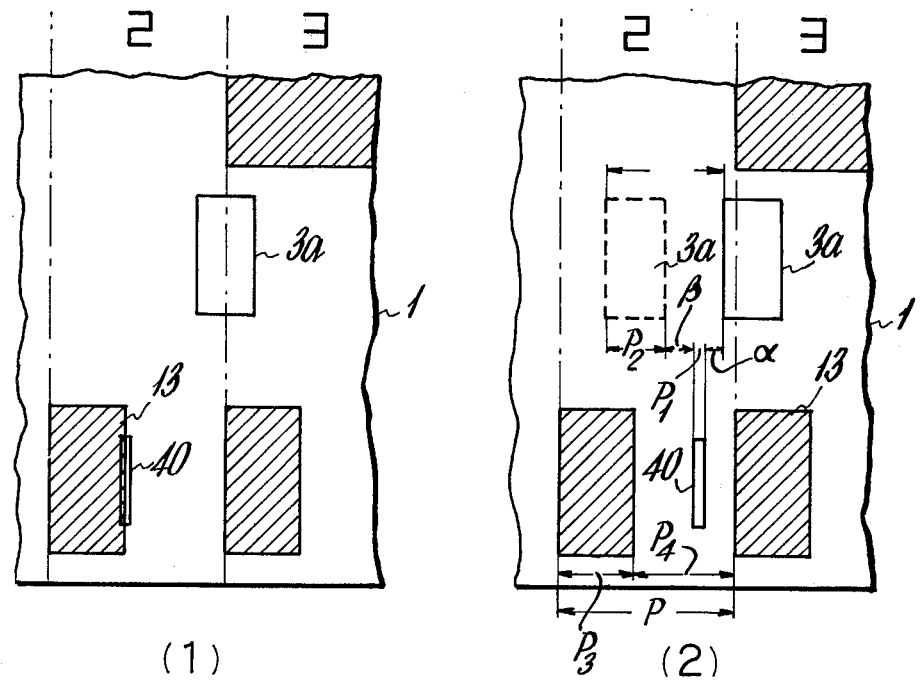
Figure 6:
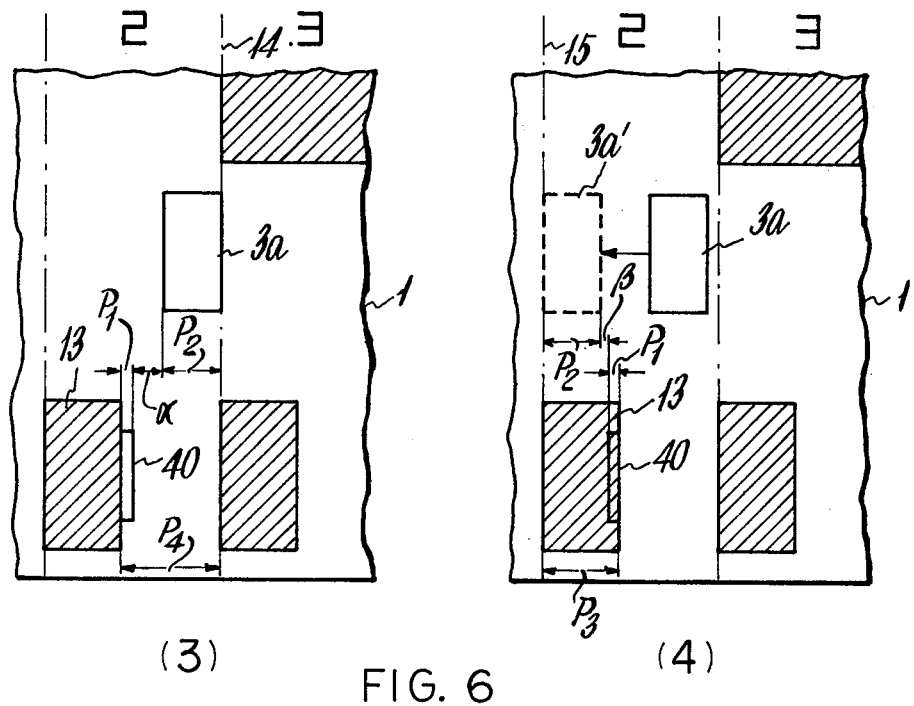
Figure 7:
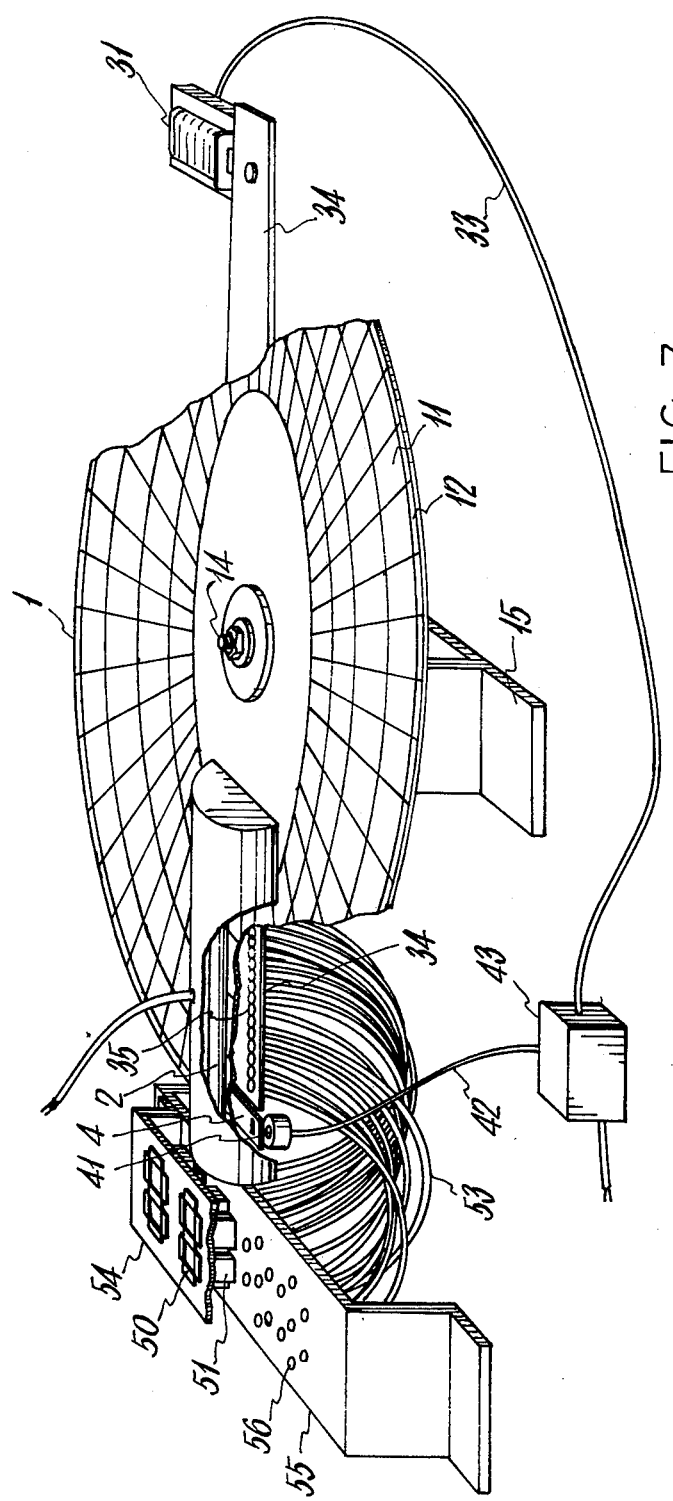
Figure 8:
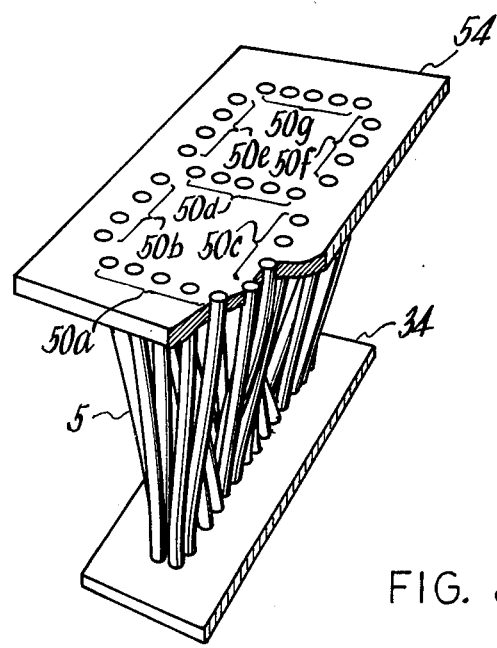
Figure 9:
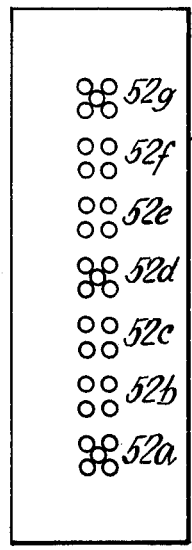
Figure 10:
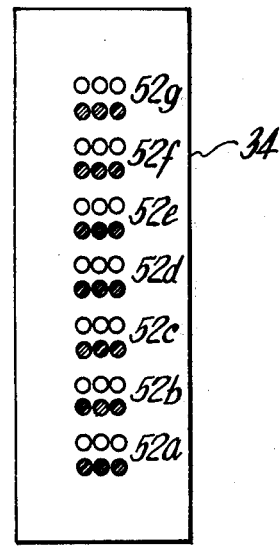

FIG. 5 (1), (2), and (3) are plan views of parts of the code plate of the device of FIG. 1 presented as an aid in explanation of a feature of this invention;

FIG. 6 (1), (2), (3), and (4) are plan views of parts of the code plate of the device of FIG. 1 presented as an aid in explanation of another feature of this invention;

FIG. 7 is a partly broken-away perspective view illustrating an embodiment of the optical character display device of this invention;

FIG. 8 is a partly broken-away perspective view illustrating the main structural components of another embodiment of the optical character display device according to this invention;

FIG. 9 is a bottom view of the supporting plate illustrating the arrangement of the ends of the display segments of the device of FIG. 8; and FIG. 10 is a bottom view of the supporting plate illustrating another arrangement of the display segments of the device of this invention.

Throughout the drawings, like reference numerals are used to denote corresponding structural components.

Referring first to FIG. 1, the optical character display device of this invention includes a code plate 1 movable in the direction of the arrow 10 with the vertical movement of a cradle of a weighing balance, for example. The code plate 1 is made of transparent material and has an opaque code pattern, which shall be described later in conjunction with FIG. 4. An elongated light source 2 such as an incandescent lamp is located under the code plate 1 to illuminate it from the underside. Just above the code plate 1, are a movable masking plate 3 and a fixed plate 4 of an opaque material having a slit therein. The masking plate 3 is coupled to an armature 32 of an electromagnet 31 so as to move a predetermined distance in the direction of the arrow 30 in response to energization of the electromagnet 31. A photoelectric element 41 such as a photocell is located over the slit 40 of the plate 4 so as to detect a light passing through it. A cord 42 of the element 41 is connected to an amplifier unit (see FIG. 7) having an output which is applied through a cord 33 to the electromagnet 31, as more specifically illustrated in FIG. 7.

Figure 2:
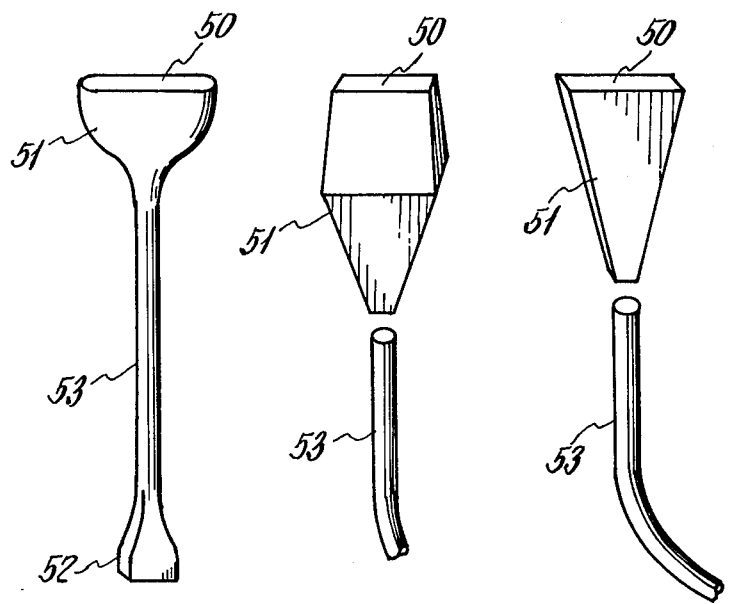

The device also includes seven display segments 5 made of an optically permeable material such as glass or synthetic resin. As shown in FIG. 2(1), the display segment 5 consists of a flattened head portion 51, an enlarged root portion 52 and an elongated light guide portion 53 and the whole surface of the of the segment is silver-plated in order to prevent leakage of the light transmitted therethrough. The top surface 50 of the head protion 51 is substantially flattened and shaped to serve as a specific part of the character to be displayed and is also frosted or coated with a luminescent material so as to become luminous when illuminated by the light transmitted through the segment. The root portion 52 is shaped so that the bottom surface has an area sufficient to cover a window of the masking plate 3 together with its range of movement.

Figure 3:
FIG. 3 is a set of plan views illustrating characters (a set of numerals) displayed by the device of FIG. 1.

The display segment 5 may be moulded integrally of a transparent material or made of a bundle of optical fibres, into a shape as shown in FIG. 2 (1). FIGS. 2 (2) and (3) represent other embodiments of the display segment. These types of segments have a rigid head portion 51 and a flexible light guide portion 53. The head portion 51 is moulded of a rigid material such as glass but the guide portion 53 is made of flexible material such as a bundle of optical fibres, and both portions are joined together. The flexible segment is not only convenient for assembling but also suitable for mass production. Moreover, it enables omission of the masking plate 3. More particularly, in this case, the root portions 52 of the display segments 5 are fixed in a line to a suitable support, with the end faces facing the transparent and opaque sections of the code pattern on the code plate 1. In such structure, the root portion 52 of the segment 5 need not be enlarged as shown in FIG. 2 (1) but may have the same crosssection as the guide portion 53. This type of display segment is especially advantageous in the case that the display panel is remote from the code plate as shown in FIG. 7. The top surfaces 50a, 50b, 50c, 50d, 50e, 50f, and 50g of the display segments 5 are arranged in a display panel as shown in the drawing, so that any character (numeral) in FIG. 3 can be constructed by properly selecting and combining the segments 5. For example, if the segments 50a, 50b, 50d, 50f, and 50g are illuminated as shown by the shaded portions in FIG. 1, the numeral "2" is displayed.

Figure 4:
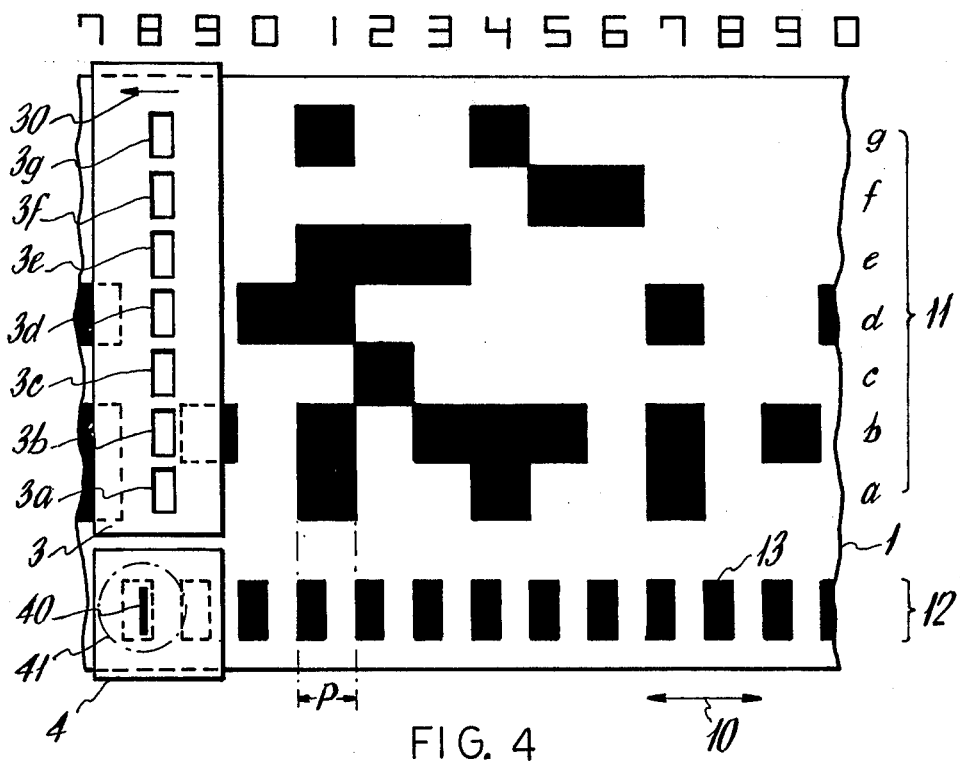
FIG. 4 is a plan view illustrating in detail a part of the device of FIG. 1.

Referring next to FIG. 4, there is shown a part of the code plate 1 of the device of FIG. 1, the masking plate 3 and a correction code region 12. In this embodiment, the character code region 11 includes ten character codes corresponding to numerals "0", "1", "2", . . . "9" each having seven bits a, b, c, d, e, f, and g represented by transparent and opaque sections of the code plate 1. The character codes are arranged repeatedly side by side on a long or endless code plate 1 at a pitch P in the direction of the movement of the code plate as indicated by the arrow 10. The correction code region 12 includes opaque squares 13 each having a width substantially equal to one half of the pitch P and being arranged at the same pitch P. The windows 3a to 3g of the masking plate 3 are arranged so as to coincide with the respective bits a to g of the character code and the slit 40 is fixed so as to coincide with the correction code region 12. The photoelectric element 41 (FIG. 1) is located over the slit 40 as shown by the broken circle 41 in FIG. 4.

Now, the operation of this device will be described in detail with reference to the drawings and especially FIG. 5. Assuming that the numeral 2 code has been moved under the windows 3a to 3g of the masking plate 3 and an opaque square 13 of the correction code also has been moved under the slit 40 of the slit plate 4 when the code plate 1 has come to a stop, as shown by FIG. 5(1). Under these conditions the light emitted from the light source 2 passes the windows of the masking plate 3, except for the windows 3c and 3e which are covered by the opaque sections of the bits c and e of the numeral 2 code, and travels separately through the corresponding display segments 5 and illuminates their top surfaces 50a, 50b, 50d, 50f and 50g, thereby forming a luminous display of numeral 2. When the numeral 3 code has been moved under the windows as shown by FIG. 5(2), the windows 3b and 3e are covered by the opaque code pattern and the display segments 50a, 50c, 50d, 50f and 50g are illuminated to display numeral 3. However, when the code plate 1 has come to a stop in the position shown in FIG. 5(3), the windows 3 b and 3c are partially covered and, accordingly, the display is confused. In this case, however, the slit 40 is positioned just above the transparent portion of the correction code as shown and, therefore, the light passes the slit 40 and is detected by the photoelectric element 41. The output of the element 41 is amplified and applied to the electromagnet 31 (FIG. 1) to energize the same. Thus, the movable masking plate 3 is pulled in the direction of arrow 30 (FIG. 4) by a distance t (FIG. 5(3)) and the windows 3a to 3g assume the position of FIG. 5(1), thereby displaying numeral 2. Thus, the confusion of display is instantaneously removed and a clear display is attained.

However, all of the display problems of this device have not been removed by the abovementioned correction means. A problem can occur when a part of the slit 40 is superposed with the opaque square 13 of the correction code 12, as shown in FIG. 6(1). In this case, the masking plate 3 is either moved or not moved depending upon the sensitivity of the correction means including the photoelectric element 41. If, in this case, the windows 3a to 3g of the masking plate 3 are on the border of the adjoining character codes shown in FIG. 6 (1), there will be substantial confusion of display. A similar problem occurs when the windows are on the border after the movement of the masking plate 3. According to another feature of this invention, these problems can be removed by properly selecting the geometric relationship among the windows, the slit and the opaque squares of the correction code.

Assuming that:
$P_1$ = width of the slit 40
$P_2$ = width of the windows 3a–3g
$P_3$ = width of the opaque squares 13
$P_4$ = interval between the opaque squares 13
$\alpha$ = interval between the slit and the windows before movement.
$\beta$ = interval between the slit and the windows after movement.

The following relation can be readily found from FIG. 6 (2).

$$t = P_1 + P_2 + \alpha + \beta \qquad (1)$$

$$P = P_3 + P_4 \qquad (2)$$

In FIG. 6, the symbols 3a and 3a' indicate the positions of the window 3a before and after the movement, respectively.

At first, consideration will be given to the case of correction means including the photoelectric element 41 having a sensitivity so low that the masking plate 3 is moved only when the whole width of the slit 40 moves out of alignment with the opaque square 13. In such a case, since the window 3a moves to the left when the slit 40 travels across the opaque square 13 from the left to the right and reaches a critical state as shown by FIG. 6 (3), the righthand edge of the window 3a must not exceed the border 14 to the right. This condition can be expressed by the following equation as readily found from FIG. 6 (3).

$$P_1 + P_2 + \alpha \leq P_4 \qquad (3)$$

On the other hand, if the sensitivity of the correction means is so high that the masking plate 3 is moved even if a slight part of the slit 40 moves out of the opaque square 13, the window 3a moves to the position 3a' when the righthand edge of the slit 40 exceeds the righthand edge of the opaque square 13 from the state of FIG. 6 (4). Therefore, the lefthand edge of the window 3a' must not exceed the border 15 to the left. This condition can be expressed by the following equation.

$$P_1 + P_2 + \beta \leq P_3 \qquad (4)$$

As described in the above, if the parameters are selected to fulfill Equations (1) through (4), there is no problem of a confused display.

In the above equations, putting $P_3 = P_4 = P/2$, a roundingoff operation for counting fractions of five and over as a unit and disregarding the rest can be attained. In order to obtain the maximum quantity of light, that is, making $P_1 + P_2$ as large as possible, $\alpha$ and $\beta$ may be selected as zero. Therefore, an example of preferable conditions is given by the following equation.

$P_1 + P_2 = P_3 = P_4 = t$, ½ p and $\alpha = \beta = 0$

The above description applies to an embodiment in which the windows 3a–3g are shifted forwardly from the slit 40 to increase the numerals and the masking plate 3 is moved backwardly. However, the same principle can be applied if these directions are interchanged and the same result can be obtained by adequately distributing the opaque squares 13 of the correction code. Moreover, the same result can be obtained even if the transparent sections and the opaque sections of the code plate 1 are mutually interchanged.

FIG. 7 represents another embodiment of the character display device according to this invention which is applied to the digital display of a balance. In the drawing, the code plate 1 is composed of a transparent disc having an annular character code region 11 including four-digit numeral codes and a circumferential correction code region 12 including correction codes as shown by 13 in FIG. 4. The code plate 1 is supported rotatably on a shaft 14 which is supported in turn on a bracket 15 and is interlocked with a cradle (not shown).

The head portion 51 of the four sets of display segments, each include seven segments and are supported by a display panel 54 which is supported on a bracket 55. The display segments are of the type as shown in FIGS. 2 (2) and (3), having a rigid head portion 51 and a flexible guide portion 53. The top surfaces 50 of the head portions 51 are arranged in a configuration as shown in FIG. 1 to form a four digit display panel and the flexible light guide portions 53 of the display segments are inserted respectively through holes 35 in the supporting plate 34 arranged in a line and face the respective bits of the character codes on the code plate 1. In this embodiment, no masking plate as shown by 3 in FIG. 1 is included but the supporting plate 34 serves a similar function to that of the masking plate 3 since the end section of the guide portion 53 is small enough to serve the function of the window 3a etc. of the masking plate 3.

Adjoining the end of the supporting plate 34, is a fixed slit plate 4 as shown in FIG. 1 having a slit facing the correction code region 12 of the code plate 1 and a photoelectric element 41. The photoelectric element 41 is connected through a cord 42 to an amplifier unit 43 having its output fed through another cord 33 to an electromagnet 31. The armature of the electromagnet 31 is coupled to the other arm of the lever 36 so that the lever 36 and accordingly the supporting plate 34, is rotated by a predetermined angle corresponding to the distance as abovementioned, when the electromagnet 31 is energized. An incandescent lamp 2 is located over code plate 1 to illuminate a radial portion of the code plate 1 facing the display segments supported by the supporting plate 34.

A detailed description of the operation of the embodiment of FIG. 7 will be omitted because it is self-evident from the description of the embodiment as shown in FIGS. 1 through 6.

Referring to FIG. 8, there shown is another embodiment of the display panel assembly according to this invention. In this embodiment, seven groups of optical fibres 5 are used instead of the seven display segments 5 in FIG. 1. Each group consists of four or five simple cut pieces of single optical fibre or bundle of optical fibres. One cut end of each group of optical fibre is inserted respectively in each of seven groups 50a–50g through holes formed in the display panel 54 in a pattern similar to that formed with the top surfaces 50a–50g of the display segments in FIG. 1 The other cut ends of the group are inserted respectively in each of seven groups 52a–52g (FIG. 9) through holes formed in a supporting plate 34 such that the cut ends of each group are gathered and face each bit of the character code on the code plate 1.

The operation of the embodiment of FIG. 8 is quite similar to that of the embodiment of FIG. 1, except that the supporting plate 34 serves the function of the masking plate 3 and that each stroke of the character corresponding to the top surface 50 of each display segment of FIG. 1 is constructed with a plurality of spots or dots. However, the embodiment of FIG. 8 has special advantages over the outer embodiments. As the display segment 5 is a simple cut piece of a conventional optical fibre, it is easily available at low cost without need for any special shaping or moulding process. Moreover, if colored optical fibres are used, characters can be displayed with multiple colors. For example, if the number of optical fibres 5 is increased and fibres of two different colors are arranged alternately on the display panel 54 and separately on the supporting plate 34 as shown in FIG. 10, and if each bit of the character code is halved and the respective halves face to the optical fibres of different colors, each character can be displayed in any one of the two colors.

As described in the above, a simple and durable digital display device is provided in accordance with this invention, without use of any expensive and complicated electric signal processing circuits and digital display tubes having a short lifetime.

It should be noted that the above description pertains only to certain embodiments of this invention and many variations, modifications and changes can be made within the claimed technical range of this invention. For example, the digital display device of this invention is applicable not only to a weighing balance but also to other measuring equipment such as digital clocks. Moreover, it can be applied to display general characters such as the alphabet and also various graphic patterns other than alphanumeral characters by properly arranging the display segments 5 on the display panel and the character codes on the code plate 1.

What is claimed is:

1. An optical character display device for converting mechanical displacement to a digital quantity, comprising a code plate carrying coded patterns of predetermined digital characters to be displayed, said patterns being composed of a predetermined number of transparent and opaque sections arranged side by side at a constant pitch, means for displacing said code plate a distance proportional to said mechanical displacement, a light source for illuminating said code plate from one side thereof, a plurality of display segments corresponding to the number of said transparent or opaque sections, each of said display segments having a light inlet end facing each of said transparent and opaque sections, a light outlet end arranged to form a part of said predetermined characters, an elongated light guide communicating with both of said ends and means for automatically adjusting alignment of the display elements and the code plate are relative to the other for effecting the maximum tansmission of light from the nearest digit code carried by said code plate to said light inlet ends for displaying said mechanical displacement to the nearest digit.

2. An optical character display device, according to claim 1, wherein said light guide of the display segment is made of a flexible material.

3. An optical character display device, according to claim 2, wherein said material is a bundle of optical fibres.

4. An optical character display device, comprising a code plate carrying coded patterns of predetermined characters to be displayed, said patterns being composed of a predetermined number of tansparent and opaque sections arranged side by side at a constant pitch, a light source for illuminating said code plate from one side thereof, a plurality of display segments corresponding to the number of said transparent or opaque sections each of said display segments having a light inlet end facing each of said transparent and opaque sections, a light outlet end arranged to form a part of said predetermined characters and an elongated light guide communicating both of said ends, said code plate further carrying a correction code pattern consisting of repeated alternation of transparent and opaque sections arranged at said constant pitch, and said device further comprises a photoelectric converting element located in facing relationship to said correction code pattern of said code plate to be illuminated through said pattern by said light source, said photoelectric element being provided with a slit located between said element and said code plate, and means for adjusting the facing positions of the light inlet ends of said display segments and said code plate are relative to the other by a predetermined distance in response to the detected output of said photoelectric element.

5. An optical character display device, according to claim 4, wherein said device further comprises a masking plate having a plurality of windows arranged respectively facing the light outlet ends of said display segments, said shifting means is incorporated with said masking plate to move said masking plate by said predetermined distance, and the light outlet end of said display degment has sufficiently large area compared with said window whereby said window does not escape said area after the movement of said masking plate.

6. An optical character display device, according to claim 4, wherein the width $P_1$ of said slit, the width $P_2$ of the outlet end of said display segment, the width $P_3$ of the opaque section of said correction code pattern, the width $P_4$ of the transparent section of said correction code pattern, said constant pitch P, said predetermined shifting distance $t$, the interval $\alpha$ between said slit and said light outlet end of the display segment along the shifting direction before the shifting motion and the interval $\beta$ between said slit and said light outlet end along the shifting direction after the shifting motion is selected so as to fulfill the following equations:

$P_1 + P_2 + \alpha \leq P_4$
$P_1 + P_2 + \beta \leq P_3$
$P_1 + P_2 = P$
$P_1 + P_2 + \alpha + \beta = t.$

* * * * *